(12) United States Patent
Sreemanthula et al.

(10) Patent No.: US 7,873,036 B2
(45) Date of Patent: Jan. 18, 2011

(54) METHOD AND APPARATUS TO PROVIDE GROUP MANAGEMENT OF MULTIPLE LINK IDENTIFIERS FOR COLLECTIVE MOBILITY

(75) Inventors: Srinivas Sreemanthula, Flower Mound, TX (US); Haihong Zheng, Coppell, TX (US); Rene Purnadi, Coppell, TX (US); Khiem Le, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 2051 days.

(21) Appl. No.: 10/770,880

(22) Filed: Feb. 3, 2004

(65) Prior Publication Data
US 2005/0169220 A1    Aug. 4, 2005

(51) Int. Cl.
*H04L 12/28* (2006.01)
(52) U.S. Cl. ................... 370/389; 370/392; 370/328
(58) Field of Classification Search ............ 370/395.52, 370/338, 349, 401, 313, 392, 393, 389, 471, 370/474, 328
See application file for complete search history.

(56) References Cited

U.S. PATENT DOCUMENTS

| | | | | |
|---|---|---|---|---|
| 6,393,482 | B1 | 5/2002 | Rai et al. .................... 709/225 |
| 6,407,988 | B1 | 6/2002 | Agraharam et al. ......... 370/328 |
| 6,473,413 | B1* | 10/2002 | Chiou et al. ................ 370/331 |
| 6,473,431 | B1* | 10/2002 | Perlman et al. ............. 370/400 |
| 6,515,974 | B1* | 2/2003 | Inoue et al. ................. 370/331 |
| 6,567,664 | B1* | 5/2003 | Bergenwall et al. ...... 455/435.1 |
| 6,571,289 | B1 | 5/2003 | Montenegro ................ 709/227 |
| 6,628,943 | B1* | 9/2003 | Agrawal et al. .......... 455/432.1 |
| 6,636,498 | B1* | 10/2003 | Leung ......................... 370/338 |
| 6,646,999 | B1* | 11/2003 | Kato et al. ................... 370/329 |
| 6,684,256 | B1* | 1/2004 | Warrier et al. .............. 709/238 |
| 6,731,621 | B1 | 5/2004 | Mizutani et al. ............ 370/338 |
| 6,751,672 | B1* | 6/2004 | Khalil et al. ................ 709/230 |
| 6,766,168 | B1 | 7/2004 | Lim ........................ 455/435.1 |
| 6,845,091 | B2* | 1/2005 | Ogier et al. ................. 370/338 |

(Continued)

FOREIGN PATENT DOCUMENTS

EP    1367780 A1 * 12/2003

(Continued)

OTHER PUBLICATIONS

Perkins, Charle E., and Johnson, David B., "Mobility Support in IPv6", 1996, MOBICOM, 1996 ACM 0-89791-872-X/96/11, pp. 27-37.*

(Continued)

*Primary Examiner*—Ricky Ngo
*Assistant Examiner*—Dewanda Samuel
(74) *Attorney, Agent, or Firm*—Harrington & Smith

(57) ABSTRACT

A method includes connecting a mobile router (MR), also referred to herein as a gateway mobile terminal, of a mobile network (MONET) to an access point (AP) of an access network (AN) that includes an Access Router (AR); making a request to obtain a plurality of link addresses from a link address manager of the AN; allocating individual ones of the plurality of link addresses to individual ones of network nodes of the MONET; and performing a neighbor discovery procedure with the AR to send at least one neighbor advertisement to declare the allocated individual ones of the assigned plurality of link addresses.

32 Claims, 6 Drawing Sheets

U.S. PATENT DOCUMENTS

| | | | |
|---|---|---|---|
| 6,862,274 B1 | 3/2005 | Tsao et al. | 370/338 |
| 6,907,017 B2 | 6/2005 | Reddy et al. | 370/331 |
| 6,930,988 B2* | 8/2005 | Koodli et al. | 370/331 |
| 6,999,437 B2* | 2/2006 | Krishnamurthi et al. | 370/331 |
| 7,330,449 B2* | 2/2008 | Takahashi et al. | 370/331 |
| 7,339,895 B2* | 3/2008 | Ozaki et al. | 370/252 |
| 7,342,914 B1* | 3/2008 | Khalil et al. | 370/349 |
| 7,376,097 B2* | 5/2008 | Yegin | 370/328 |
| 7,710,956 B2* | 5/2010 | Suzuki et al. | 370/389 |
| 2001/0046223 A1* | 11/2001 | Malki et al. | 370/338 |
| 2002/0039357 A1* | 4/2002 | Lipasti et al. | 370/338 |
| 2002/0126642 A1* | 9/2002 | Shitama | 370/338 |
| 2002/0157024 A1* | 10/2002 | Yokote | 713/201 |
| 2003/0016655 A1* | 1/2003 | Gwon | 370/352 |
| 2003/0018715 A1 | 1/2003 | O'Neill | 709/204 |
| 2003/0026230 A1* | 2/2003 | Ibanez et al. | 370/338 |
| 2003/0084293 A1* | 5/2003 | Arkko et al. | 713/168 |
| 2003/0087646 A1* | 5/2003 | Funato et al. | 455/456 |
| 2003/0117965 A1 | 6/2003 | Markki et al. | 370/254 |
| 2003/0161287 A1 | 8/2003 | Venkitaraman et al. | 370/338 |
| 2003/0174667 A1* | 9/2003 | Krishnamurthi et al. | 370/328 |
| 2004/0013099 A1* | 1/2004 | O'Neill | 370/338 |
| 2004/0057440 A1* | 3/2004 | Thubert et al. | 370/401 |
| 2004/0111483 A1* | 6/2004 | Watanabe | 709/207 |
| 2004/0218573 A1 | 11/2004 | Takahashi et al. | 370/338 |
| 2004/0246931 A1 | 12/2004 | Thubert et al. | 370/338 |
| 2005/0172014 A1 | 8/2005 | Zheng et al. | 709/221 |

FOREIGN PATENT DOCUMENTS

| | | |
|---|---|---|
| EP | 1367780 A1 | 12/2003 |
| EP | 1376973 A1 | 1/2004 |
| EP | 1376973 A1 * | 1/2004 |
| EP | 1473901 A2 | 11/2004 |

OTHER PUBLICATIONS

Kyeong, Jin Lee,."Route Optimization for MobileNodes in Mobile Network based on Prefix Delegation", 2003, IEEE, pp. 2035-2037.*

Perkins et al; "Mobilty Support in IPv6"; 1996 MOBICOM, 1996 ACM 0-89791-872-X/96/11; pp. 27-37.*

Narten et al.; "Neighbor Discovery fro IP version 6 ( IPv6)"; 1998; Network working Group; pp. 1-79.*

Lee et al; "Route Optimizartion for Mobile Nodes in Mobile Netwiork based on prefix Delegation"; 2003; IEEE; pp. 2035-2037.*

Ernst et al.;("Network Mobility Support Terminology", 2002); IETF Internet Draft; pp. 1-18.*

Ernst ("Network Mobility Support Terminology"); 2003; IETF; pp. 1-18.*

Bryant et al. ( "Pseudo Wire Emulation Edge-to-Edge (PWE3) Architecture"); Mar. 2005; Network Working Group; pp. 1-53.*

Lee, K. et al., "Route Optimization for Mobile Nodes in Mobile Network Based on Prefix Delegation", Vehicular Technology Conference, 2003, pp. 2035-2038, VTC 2003-Fall.

Devarapalli, et al., "Network Mobility (NEMO) Basic Support Protocol", Dec. 2003, pp. 1-29.

* cited by examiner

METHOD AND APPARATUS TO PROVIDE GROUP MANAGEMENT OF MULTIPLE LINK IDENTIFIERS FOR COLLECTIVE MOBILITY

TECHNICAL FIELD

This invention relates generally to mobile data communication networks, and more specifically relates to Internet Protocol (IP) networks and access technologies, particularly advanced wireless access technologies capable of supporting mobility and related features, such as Quality of Service (QoS) features, for providing enhanced services to the users and user terminals.

BACKGROUND

The following additional abbreviations will be referenced in the ensuing description.

| | |
|---|---|
| AP | Access Point |
| AR | Access Router |
| BU | Binding Update |
| CoA | Care-of Address |
| HA | Home Agent |
| HA_MR | Home Agent Mobile Router |
| LLA | Link Layer Address |
| MAC | Media Access Control |
| MNN | Mobile Network Node |
| MONET | MObile NETwork |
| MR | Mobile Router |
| PAN | Personal Area Network |
| PSBU | Prefix Scope Binding Update |

In general, network mobility support deals with managing the mobility of an entire network, viewed as a single unit, which is capable of changing its point of attachment to the Internet and thus its reachability in the Internet topology. This type of network can be referred to as a MONET, and includes at least one MR connected to the global Internet. Those nodes behind the MR, referred to as MNNs, may be fixed or mobile.

A MONET can take several different forms, examples of which include the following.

Networks attached to a PAN: A mobile phone having a cellular interface and a local interface, such as a Bluetooth™ interface, together with a Bluetooth-enabled PDA constitute a very simple instance of a mobile network. In this case the mobile phone, also referred to herein as a gateway terminal, functions as the MR that is attached to the Internet via cellular links, while the PDA functions as a MNN that is used for web browsing or running a personal web server.

Access networks deployed in public transportation: A public transportation vehicle provides Internet access to IP devices carried by passengers. The access points in the vehicle function as MRs, while the passenger's personal communication devices are MNNs.

FIG. 1 shows an example of a conventional MONET 1 and its connection to the Internet 2. The MR 3 of the MONET 1, which could be called a gateway terminal and that may be a wireless device having mobile cellular capabilities, and in some cases may be embodied in a cellular telephone, connects to the Internet 2 via an access network 4. An AR 5 in the access network 4 is a first-hop router that connects the MR 3 to the Internet 2. At least one link technology-specific AP 6 may exist between the MR 3 and the AR 5 to provide link layer connectivity between the MR 3 and the AR 5. The MR 3 may move between APs 6 (shown as 6A and 6B) and/or ARs 5, and thus a handover mechanism is provided. A plurality of MNNs 7 (shown for convenience as three MNNs, two being mobile and one being fixed) connect to the access network 4 via the MR 3. The link technology used in the MONET 1 may or may not be the same as the link technology used between MR 3 and the AP 6. Each MNN 7 and the MR 3 may configure its own EUI-64 Link Layer Address (LLA) based on the link technology in use.

Two types of approaches can be employed to provide mobility control and address management to the MNNs 7.

A first type of approach is a NEMO technique. NEMO support requires that none of the nodes behind the MR 3 be aware of the MONET mobility. In other words, the change of attachment of the MONET 1 should be completely transparent to the MNNs 7 behind the MR 3.

The basic NEMO approach is illustrated in FIG. 2. The MR 3 is assumed to have an assigned home network with a home agent referred to as the HA_MR 8. Each MONET 1 where a MR 3 resides is assigned a MONET network prefix (MNP), which is the permanent network prefix assigned in the home link of the MR 3. The MNP is not changed when the MR 3 moves its network attachment from one AR 5 to another. The ingress interface of the MR 3 is configured with the MNP, and the CoAs of all the MNNs 7 in the MONET 1 are configured using the MNP. As long as the MNN 7 resides within the same MONET 1 its CoA need not be changed. The MNN 7 may update a binding cache 9 in its own HA 10 and correspondent nodes 12 by sending a BU. With this configuration, all of the packets sent to the CoA of the MNN 7 are first routed to the home link of the MR 3, and intercepted by the HA_MR 8, which further routes the packet to the MR 3 as described below.

The MR 3 configures its CoA using the network prefix advertised by the serving AR 5 (AR-1) on its egress interface. When the MR 3 changes its attachment point, it reconfigures its CoA using the prefix of the new AR 5 (AR-2). In addition to sending a BU with the new CoA to the HA_MR 8 to update the binding cache 9A, the MR 3 also sends a Prefix Scope Binding Update (PS BU) message to the HA_MR 8. The PS BU is an enhanced BU that associates the CoA of the MR 3 to the MNP instead of to a single address. The HA_MR 8 uses this binding to tunnel (shown generally as tunnel 11) to the MR 3 any packet that shows the MNP in the destination field, although some other scheme (e.g., router optimization) may be used to avoid or reduce the overhead due to the tunneling between the HA_MR 8 and the MR 3. After decapsulating the tunneled packet from the HA_MR 8, the MR 3 forwards the original packet to the correspondent MNN 7 within the MONET 1.

With this approach, even when the MR 3 moves between ARs 5, and thus changes its CoA, the MNNs 7 within the MONET 1 are enabled to use the same CoA, and no new CoAs are needed for MNNs. This reduces the overhead due to IP mobility of each MNN 7. However, the overhead due to the bi-directional tunneling between the HA_MR 8 and the MR 3 is posted over the interface between the MR 3 and the AR 5, and is applied to all packets inbound to or outbound from the MNNs 7. Since the access interface between the MR 3 and the access network 4 is most likely a radio interface in the cases of particular interest to this invention, the overhead incurred by the use of the tunneling 11 reduces the spectrum efficiency of the wireless link.

A second approach is a flat structure technique, where instead of providing grouped IP mobility as in the NEMO approach, each MNN 7 is responsible for handling its own IP mobility. Each MNN 7 configures its associated CoA using the prefix of the serving AR 5. Whenever MR 3 attaches to a new AR 5, each MNN 7 reconfigures its CoA and sends a BU to its HA 10 and correspondent nodes. Packets flowing towards a MNN 7 are routed based on the CoA of the MNN 7 and, thus, no tunneling protocol is required between the HA_MR 8 and the MR 3 as in the NEMO approach.

Each of these two approaches may be used in different applications, and in some cases may coexist.

A topic that is being widely discussed is the mobility of (sub) networks as a whole from one network point of attachment to another, as in the NEMO approach described above in regards to FIG. 2. Generally, the MONET 1 can be operated in at least two modes. A first mode is a single user mode where a single user with one subscription has multiple devices (multiple MNNs 7). For example, this mode can commonly arise in a home or automobile environment where multiple devices are owned by a single user.

A second mode is a multi-user mode where there are multiple users each with one or more devices (multiple MNNs 7). For example, this mode can commonly arise in the context of a service provider in a mass transportation vehicle, such as a bus or a train, or in an airport café or other similar environment.

In certain access technologies such as Ethernet each end terminal (each MNN 7) has a link identifier (MAC address) hard-coded by the terminal manufacturer. The link identifier acts as an identifier to provide various access network functions such as address resolution for forwarding traffic, as well as authorization and other network functions. However, while a hard-coded link identifier may offer some uniqueness, it does not guarantee uniqueness on a global scope. For example, the hard-coded link identifier may guarantee uniqueness only among the subset of terminals devices that are manufactured by a given manufacturer, but not among the complete set of those terminal devices that are manufactured by all manufacturers. As a result, IPv6 Neighbor Discovery functions are specified to perform a test for uniqueness on a certain link. However, this uniqueness testing adds messaging overhead and results in additional costs for some expensive resources over licensed mediums.

One way to avoid these disadvantages is to permit the AN 4 to provide LLAs to the MNNs 7 as link identifiers that are guaranteed to be unique to every node in the AN 4. These link identifiers can be managed by the AN 4.

However, whether or not there is grouped mobility, the current approaches involve the gateway device (e.g., the MR 3) performing address management for all MNNs 7 within the MONET 1. The AN 4 that the gateway device is connected to may not be aware of the individual MNNs 7, but only the LLA of the gateway device, e.g., only the LLA of the MR 3.

In some cases, all of these functions in the AN 4 can be performed by the use of the gateway device alone, such as in the single user mode referred to above. However, in the multi-user mode this situation generally causes problems since the AN 4 needs to know the LLA of the individual MNNs 7 in order to provide certain functions such as security, registration, policy enforcement and customized QoS support on a per-user or per-subscription or per-MNN 7 basis. At present, available access technologies have the capability to provide the LLA for individual MNNs 7. However, this results in an inefficient mechanism to provide the LLA on an individual per-MNN 7 basis since there may be many nodes in a MONET 1, such as in a train.

Still referring to FIG. 2, several MNNs 7 can be connected to the MR 3 in the MONET 1. The MR 3 provides either stateful IPv6 addresses to the MNNs 7 or it provides a (permanent) network prefix for the individual MNNs 7 to form their own stateless IPv6 addresses. The AR-1 that the MR 3 is connected to knows only the address of the MR 3. The AR-1 provides a network prefix that the MR 3 uses to form its own address on the egress interface of MR (CoA-1). The MR 3 registers this CoA with the HA_MR 8 to establish the binding between the CoA-1 to the permanent network prefix used within the MONET 1. This binding allows the HA_MR 8 to tunnel 11 the traffic for any of the addresses within that permanent prefix to the MR 3, using the CoA-1 as the destination address of an outer IPv6 header. The MR 3 removes the outer header and forwards the packet to the individual terminals (MNNs 7) using the LLA as indicated in the neighbor cache of the MR 3 (not shown in FIG. 2).

This mechanism functions to effectively mask the presence of all the MNNs 7 within the MONET 1 to the AR-1, since all of the traffic for the individual MNNs 7 is IP-tunneled 11 from the HA_MR 8, and the AR-1 always sees only the CoA of the MR 3. The AR-1 maintains its' neighbor cache based on the LLA of the MR 3. As a result, the security, policy control, QoS authorization, accounting and so forth for the MNNs 7 are all handled based on the identity of the MR 3. As was explained above, this approach may be adequate for the single-user mode, although greater flexibility to provide customized functions by directly identifying each user within the MONET 1 is desired for the multi-user mode. Prior to this invention, a fully satisfactory solution to this problem was not known to the inventors.

SUMMARY OF THE PREFERRED EMBODIMENTS

The foregoing and other problems are overcome, and other advantages are realized, in accordance with the presently preferred embodiments of these teachings.

In one aspect this invention provides a system and a method to manage addresses in a network. The method includes connecting a MR, also referred to herein as a gateway mobile terminal, of a MONET to an access point AP of an AN that includes an AR; making a request to obtain a plurality of link addresses from a link address manager of the AN; allocating individual ones of the plurality of link addresses to individual ones of network nodes of the MONET; and performing a neighbor discovery procedure with the AR to send at least one neighbor advertisement to declare the allocated individual ones of the assigned plurality of link addresses. In one embodiment the request is made to obtain a set of LLAs that are allocated to individual ones of the network nodes, while in another embodiment the request is made to obtain a group identification (Group_ID) that is used to formulate a set of LLAs that are allocated to individual ones of the network nodes. The LLAs can be passed through the MR to the individual network nodes, if the MONET signaling allows, or the MR can map the LLAs to hardwired addresses of individual ones of the network nodes.

Also disclosed herein is a mobile station having a stored program and a data processor that executes the stored program for being operable in a data communications network to function as a gateway mobile terminal that can be coupled between at least one MNN and an AP of an AN that comprises an AR. The data communications network is assumed to include an LLA manager for managing LLAs in accordance with this invention. The mobile station data processor is responsive to the mobile station connecting to the AP to request information from the LLA manager that relates to a plurality of LLAs, and to allocate individual ones of the plurality of LLAs to individual ones of the MNNs.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 3:
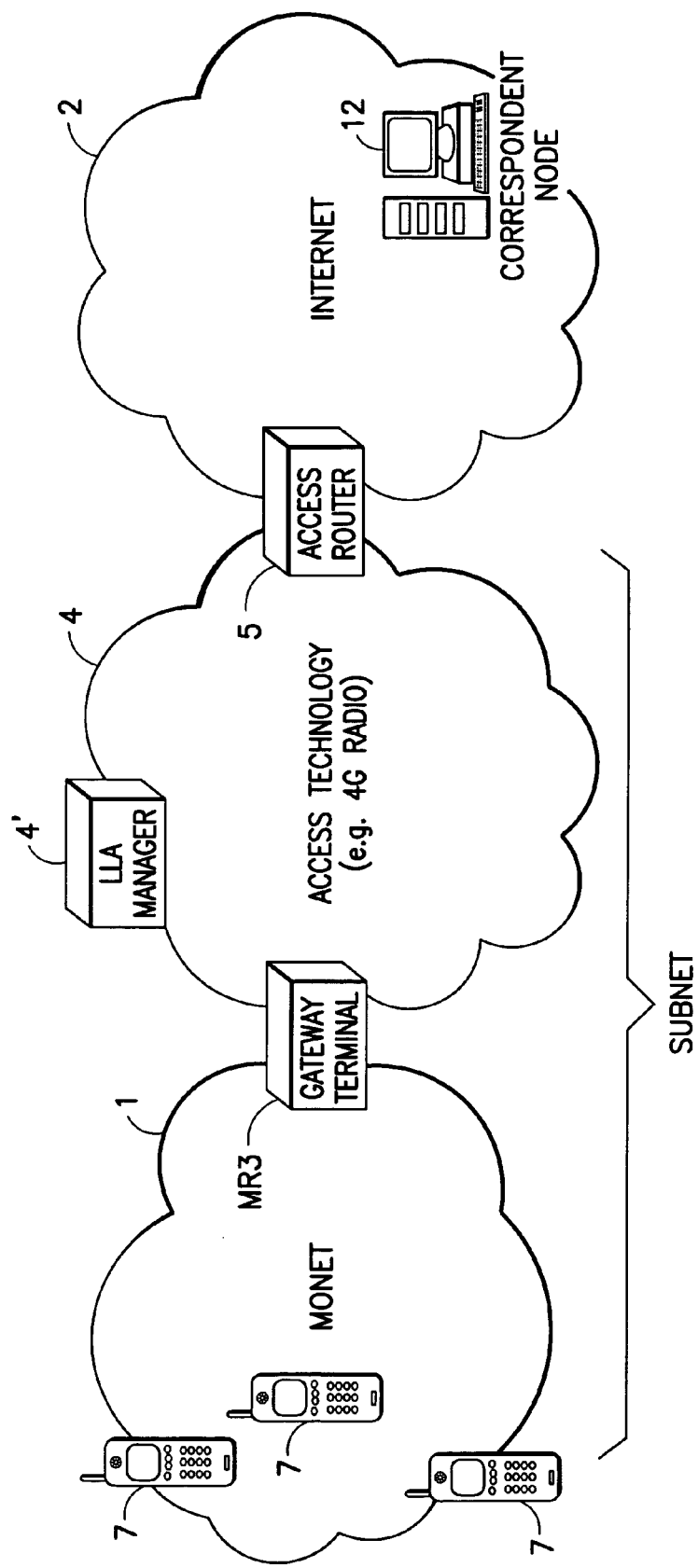
FIG. 3 is a simplified block diagram that places this invention into a technological context.

Referring to FIG. 3, in accordance with an aspect of this invention, any node for itself, or on behalf of another node or nodes (as the gateway mobile terminal or MR 3) can request and obtain more than one access network or a link identifier (e.g., more than one LLA) for the purpose of being uniquely identified and addressed as an end terminal (or a different user) within the access network 4. In this manner the MR 3 can obtain customized (access) network functions and service provisioning. This aspect of the invention includes a request-response mechanism to obtain a set of identifiers (e.g., a set of LLAs), or to obtain a unique identification (e.g., a Group Identification) from which the MR 3 can construct a set of identifiers for the MNNs 7. The request-response mechanism exists between a network entity (such as the MR 3) or end terminals and an access network entity, referred to herein for convenience as a link layer address manager (LLA_Manager) 4'. In a presently preferred embodiment the identifiers are managed by the AN 4. When the identifiers are allocated to a certain MONET 1, the access network 4 entity managing the identifiers, in the preferred embodiment the LLA_Manager 4', operates to ensure that the same identifiers are not re-allocated to another MONET.

It should be noted that while FIG. 3 shows for convenience that the LLA_Manager 4' is associated with the AN 4, in practice the LLA_Manager 4' could be located elsewhere in the network architecture, and need not be located in or otherwise associated with the AN 4.

It should be noted that, in general, a "router" function may be associated with L3 functions, whereas the operation of the MR 3 in accordance with this invention is more concerned with L2 functions, such as link identifier assignments, and not primarily with routing functions per se. Thus, while the gateway terminal or gateway mobile terminal device enumerated as 3 is referred to for convenience below as a "mobile router" or MR 3, it should be kept in mind that what is of most concern to this invention is the link identifier assignment capability of the device 3, and not any specific routing functionality that the device 3 may possess.

This invention can be extended to support other variations of the foregoing procedure. For example, a request could be for a group identifier (Group_ID), instead of for individual identifiers, and the AN 4 in response provides a Group_ID to the requesting entity (see FIG. 6, discussed below). Once assigned and in use, the Group_IDs are not further assigned to another MONET. In this case the requesting entity may form individual identifiers based on the Group_ID in accordance with some predefined encoding scheme, or in accordance with some Group_ID-to-individual ID mapping function. The newly formed identifier is uniquely identified by the AN 4 entity, such as by the LLA_Manager 4' in the presently preferred embodiment. As but one example, a 64-bit LLA may include an n-bit prefix that is equal to, or based on, the Group_ID.

Figure 4:
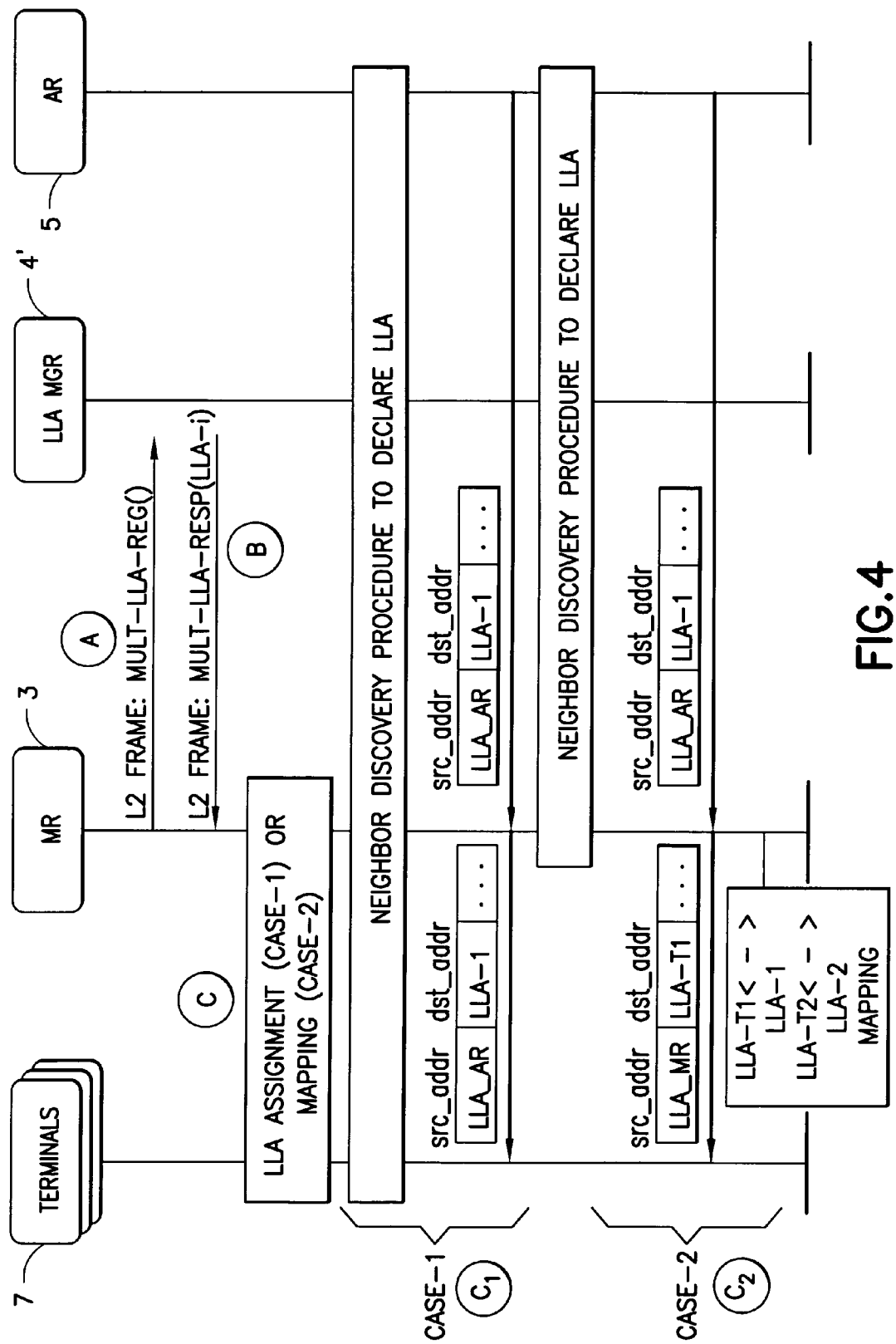
FIG. 4 depicts an embodiment of an implementation of this invention in a radio network.

The teachings of this invention are applicable to any access network. For example, FIG. 4 depicts an implementation in an exemplary fourth generation (4G) radio access network (RAN). The 4G RAN is a next generation wireless technology and is an evolution of existing 3G or IEEE 802.11x radio technologies. In that specification efforts are on-going for the 4G RAN, it is possible to design the lower layer protocols to accommodate various service scenarios, including those in accordance with this invention.

At the transaction labeled as A, the gateway device or terminal, such as the MR 3, sends a request to some access network 4 entity (such as the LLA_Mgr 4') for a multiple LLA assignment (a Mult_LLA_Req( ) message is sent in an L2 frame). A parameter may be included in the Mult_LLA_Req( ) message to indicate a specific number of LLAs, e.g. $2^3$ or $2^4$ LLAs. At the transaction labeled as B, the LLA_Mgr 4' assigns a set of LLAs, not assigned previously, to the MR 3.

In practice, the LLA_Mgr 4' tags all of the assigned LLAs as a part of one MONET 1, and mobility is simplified by tracking the set of LLAs as a whole, as opposed to tracking individual LLAs. The LLA of the MR 3 may be assigned from one of the set of LLAs provided by the LLA_Mgr 4', or another procedure can be used to assign a different LLA to the MR 3.

The use of the assigned set of LLAs is managed by the MR 3 during the transactions labeled as C. At least two management cases are within the scope of this invention.

In a first case ($C_1$), and if the access technology in the MONET 1 allows individual MNNs 7 to obtain a unique LLA from a centralized location (the MR 3 in this example), then the MR 3 provides one of the LLAs from the assigned set to one of the MNNs 7. In this capacity, the MR 3 merely acts as a bridge between the LLA_Mgr 4' and individual ones of the MNNs 7. The individual MNNs 7 can perform IP level messaging, such as Neighbor Discovery, with the AR 5 to send a neighbor advertisement to declare the assigned LLA.

In the second case ($C_2$), where the access technology in the MONET 1 does not allow such assignment by the network (e.g. Ethernet), then the MR 3 maintains a mapping (such as in a mapping table) between one of the LLAs of the assigned set of LLAs and the hard-coded MAC address of one of the MNNs 7. In this second management case the MR 3 associates a LLA to a MAC address, as indicated in the mapping table, for all communications between the MNNs 7 and the AR 5. In this case the MR 3 performs individual (or grouped) Neighbor Discovery procedures on behalf of the individual MNNs 7 and the AR 5, and can send a neighbor advertisement on behalf of one or more of the plurality of MNNs 7 behind the MR 3.

Figure 5:
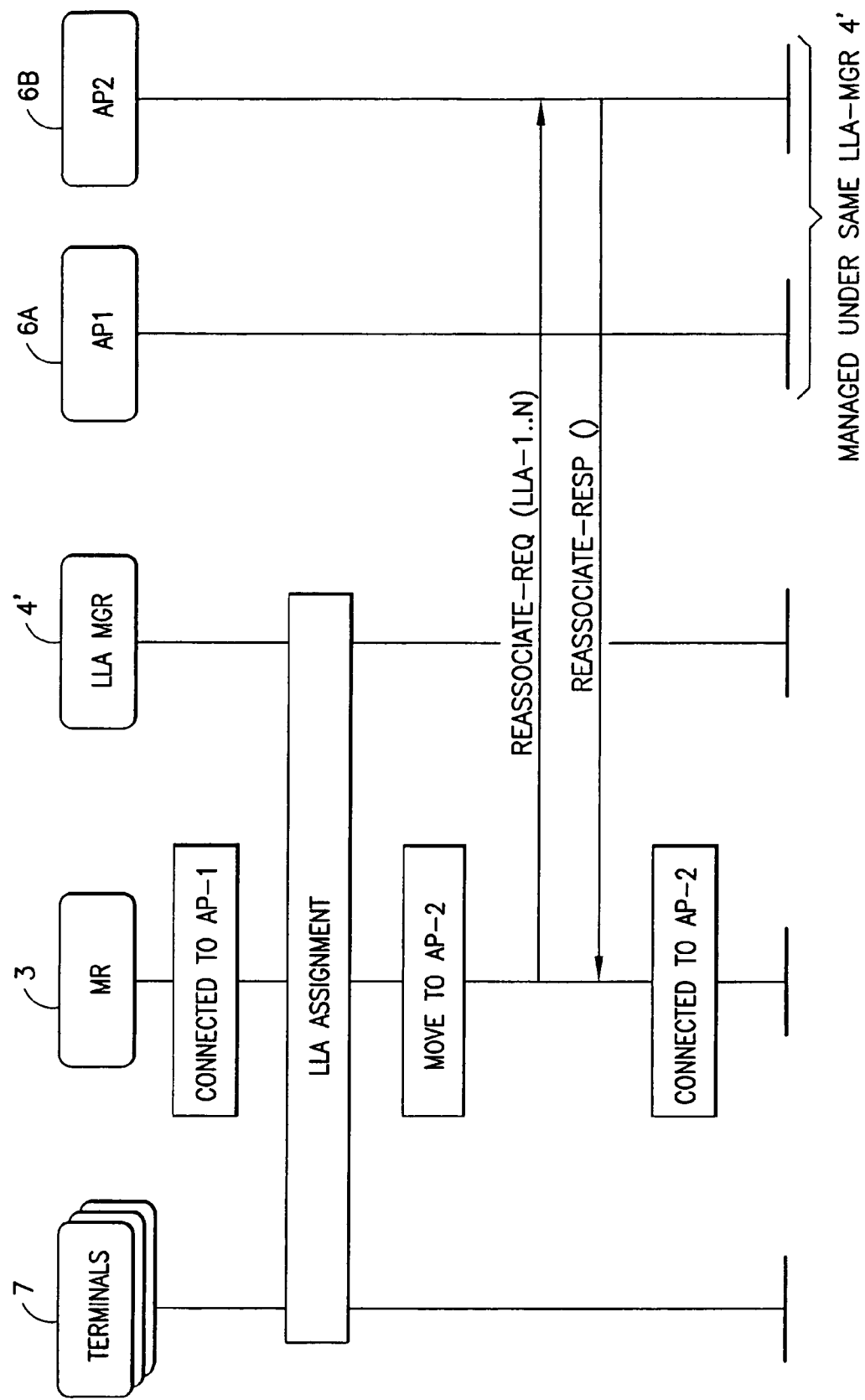
FIG. 5 illustrates an example of grouped mobility in the radio network that uses a Reassociate Request and Response mechanism.

FIG. 5 illustrates a technique for accommodating grouped mobility within a 4G RAN, where a group of MNNs 7 with previously allocated LLAs within one MONET 1 are moved and reassociated to a new access point (e.g., from AP 6A to AP 6B as in FIG. 1) with one message exchange. The AP 6A and AP 6B are assumed to be managed under the same LLA_Mgr 4' of the same AN 4. In this example, and as part of a handover procedure from AP 6A to AP 6B, the MR 3 sends a message to AP 6B (a Reassociate_Request (LLA1 ... LLA$_n$) message). A message, Reassociate_Response( ), may be sent back to the MR 3 from the AP 6B to acknowledge receipt of the Reassociate_Req (LLA1 ... LLA$_n$) message, and the reassociation of the set of LLAs to AP 6B.

Figure 1:
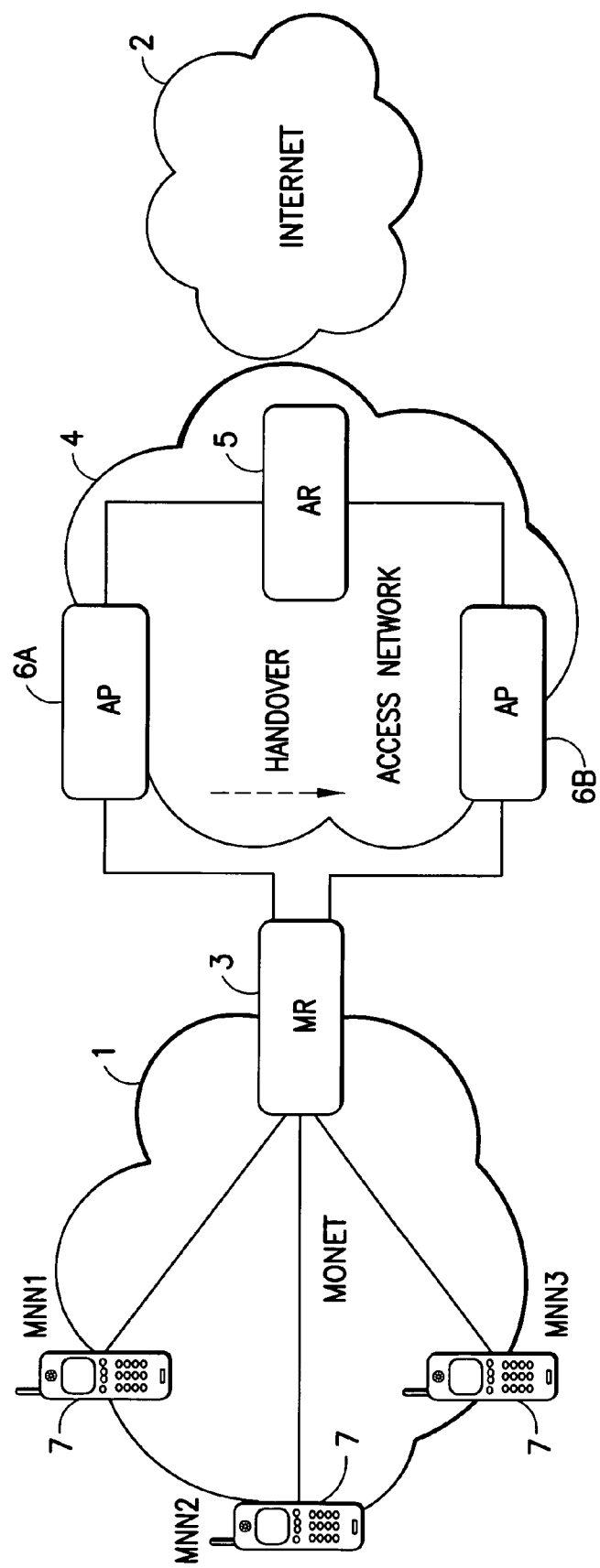
FIG. 1 illustrates a conventional MONET and its connection to the Internet.
Figure 2:
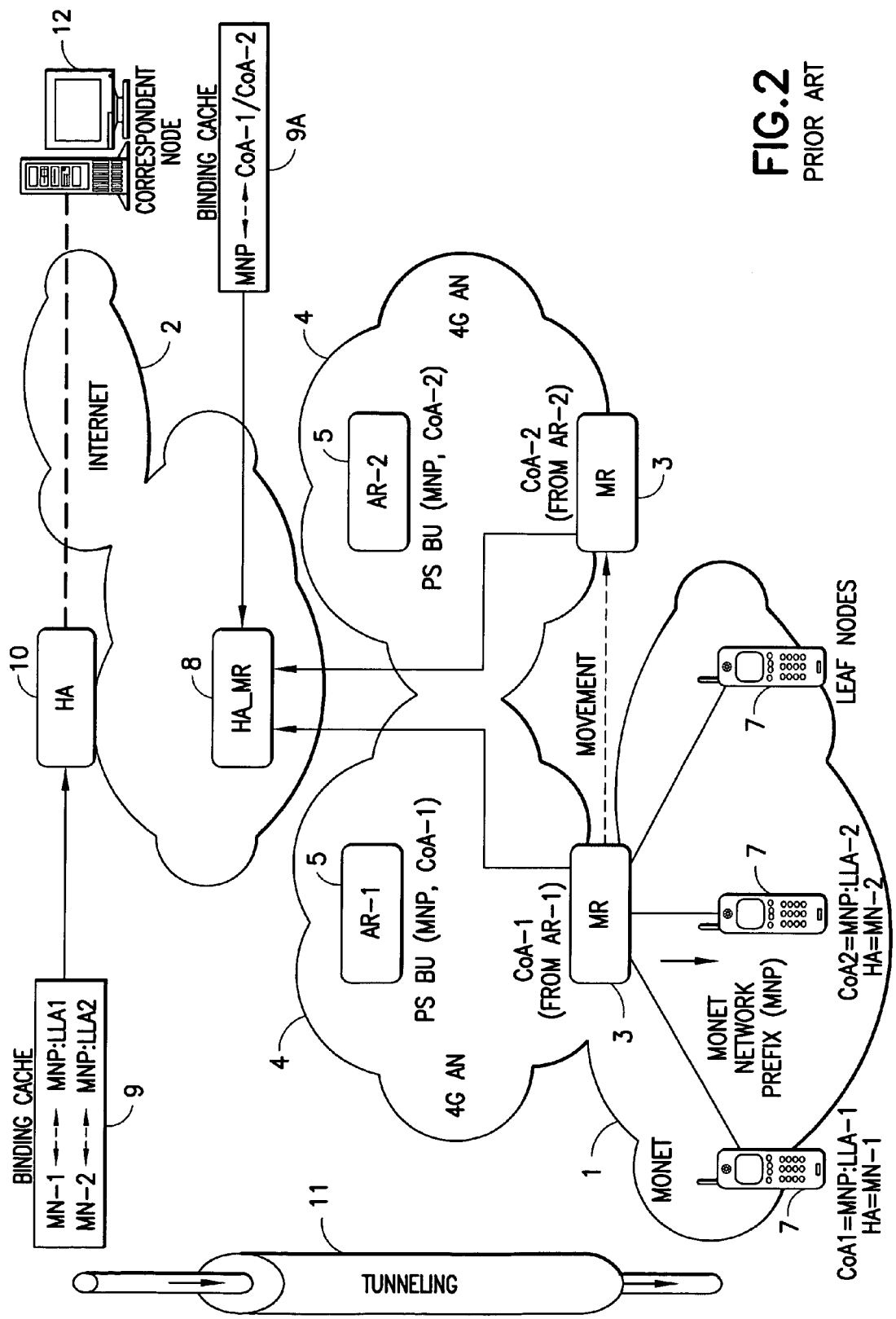
FIG. 2 shows a conventional NEMO-based mobile network mobility system.
Figure 6:
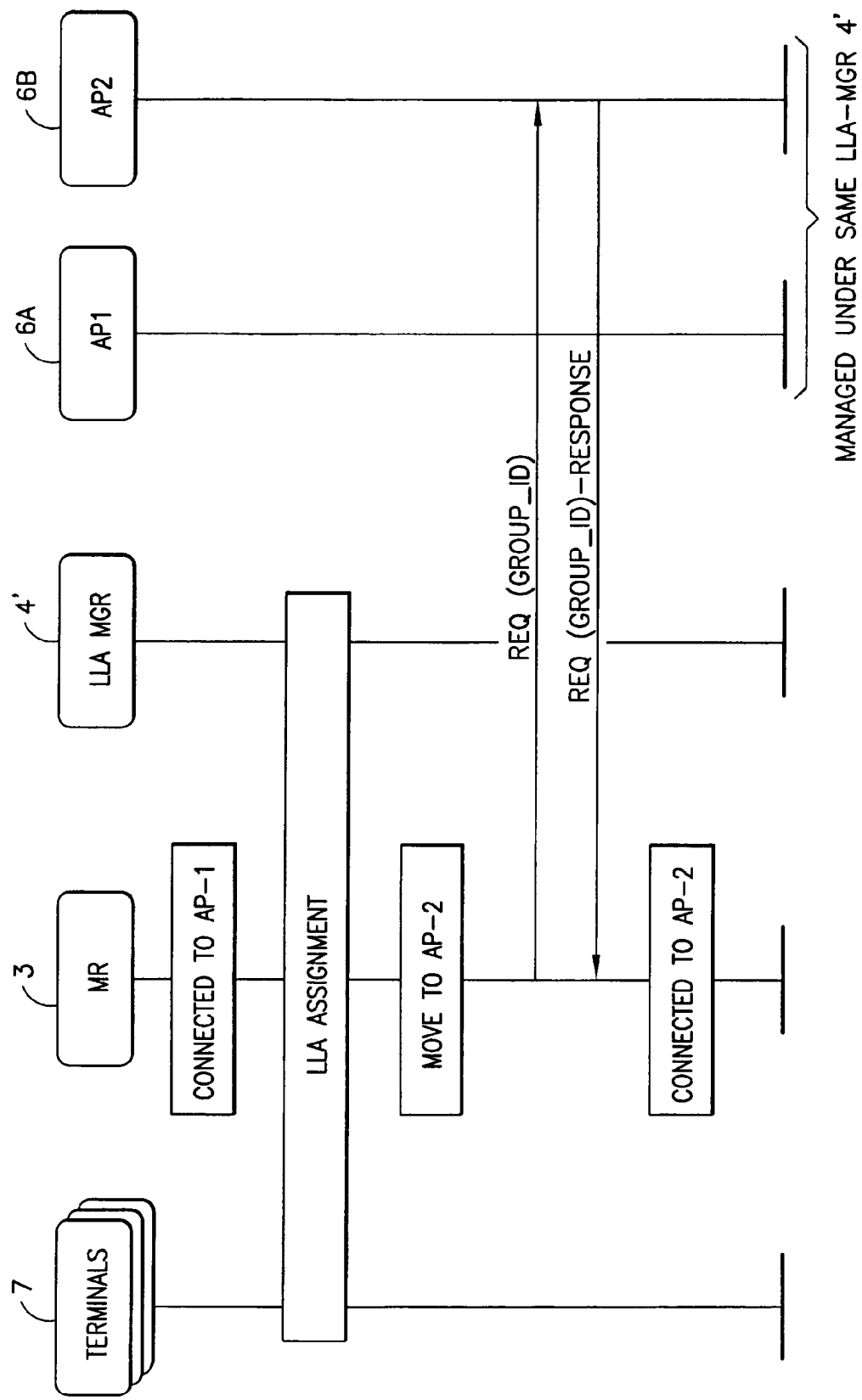
FIG. 6 illustrates an example of grouped mobility in the radio network that uses a Request (Group_ID) and Response mechanism.

FIG. 6 illustrates another technique for accommodating grouped mobility within the 4G RAN, where a group of MNNs 7 that have in common a previously allocated Group_ID within one MONET 1 are moved to the new access point (e.g., from AP 6A to AP 6B as in FIG. 1 and FIG. 5). In this example the message exchanges for LLA assignment are between the MR 3 and the LLA_Mgr 4', as shown, and a Group_ID is assigned from the LLA_Mgr 4' to the MR 3. Also in this example, and as part of a handover procedure from AP 6A to AP 6B, the MR 3 sends a message to AP 6B and a response message may be sent back to the MR 3 from the AP 6B. In this embodiment the message sent from the MR 3 may be equivalent to the Reassociate message of FIG. 5 so as to reassociate a previously assigned Group_ID, used by the MR 3 to formulate LLAs for the MNNs 7, from the first AP 6A to the second AP 6B.

The foregoing techniques provide an optimized way to obtain multiple link identifiers over access technologies where resources may be scarce. Also, spectrum usage efficiency is improved by the use of a single procedure to provide node identifiers in the MONET 1. Furthermore, the use of this invention avoids a requirement to provide a duplicate address detection function, since the uniqueness of the link identifiers can be guaranteed within the access network 4 (or link). In addition, L2 mobility is simplified by identifying a group of LLAs, and tracking the mobility at a group level as opposed to an individual LLA level. In general, the use of this invention enhances the processing efficiency and performance in the access network 4 due to reduced signaling requirements.

Additional exemplary and non-limiting applications for the teachings of this invention are described in commonly assigned U.S. patent application Ser. No. 10/770,881, filed on even date with this patent application, and entitled "Method and Apparatus Providing Address Management in a Flat Structure Mobile Network", also by Haihong Zheng, Khiem Le, Rene Purnadi and Srinivas Sreemanthula, the disclosure of which is incorporated by reference herein in its entirety.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message names and formats may be attempted by those skilled in the art. Further by example, while this invention has been described generally in the context of IPv6 procedures, and can include the use of neighbor caches and neighbor discovery procedures, at least some aspects of this invention can be applied to other networking procedures having equivalent or different address management mechanisms. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A system comprising:
   a mobile network having a gateway mobile terminal and at least one mobile network node; and
   an access network comprising an access point, an access router and a link layer address manager configured to manage link layer addresses, said mobile network being connectable via the gateway mobile terminal to the access point, where the gateway mobile terminal is configured to send a request to the link layer address manager for information relating to a plurality of link layer addresses, to receive a response to the request and to allocate, based on the response, individual ones of the plurality of link layer addresses to individual ones of the at least one mobile network node, where at least one of the gateway router or at least one mobile network node is configured to perform a neighbor discovery procedure with the access router to send at least one neighbor advertisement declaring at least one allocated link layer address.

2. A system as in claim 1, where at least one of the gateway router and the at least one mobile network node is configured to perform a neighbor discovery procedure with the access router to send at least one neighbor advertisement declaring at least one allocated link layer address.

3. A mobile station comprising:
   a transceiver configured to enable communication such that the mobile station functions as a gateway mobile terminal for being coupled between at least one mobile network node and an access point of an access network, where the mobile station and the at least one mobile network node belong to a mobile network; and
   a data processor configured to send a request for information to a link layer address manager of the access network, wherein the information relates to a plurality of link layer addresses, and wherein the data processor is further configured, in response to receiving a response to the request from the link layer address manager, to allocate individual ones of the plurality of link layer addresses to individual ones of the at least one mobile network node.

4. A mobile station as in claim 3, where said data processor is operable to perform a neighbor discovery procedure with an access router of the access network to send at least one neighbor advertisement to declare a link layer address allocated to the at least one mobile network node.

5. A mobile station as in claim 3, where the information relating to a plurality of link layer addresses comprises a group identification, and where said data processor is operable to use the group identification to formulate a set of link layer addresses, individual ones of which are allocated to individual ones of the at least one mobile network node.

6. A mobile station as in claim 3, where the information relating to a plurality of link layer addresses comprises a set of link layer addresses individual ones of which are mapped to a hardwired address of individual ones of the at least one mobile network node.

7. A mobile station as in claim 3, where the information relating to a plurality of link layer addresses comprises a set of link layer addresses individual ones of which are mapped to a media access control address of individual ones of the at least one mobile network node.

8. A mobile station as in claim 3 where the request is made to obtain a set of link layer addresses, where the set of link layer addresses are associated with a first access point, and where said data processor further operates, in response to changing a connection of the mobile station from the first access point to a second access point, to send a message to reassociate the set of link layer addresses with the second access point.

9. A mobile station as in claim 5 where the group identification is associated with a first access point, and where said data processor further operates, in response to changing a connection of the mobile station from the first access point to a second access point, to send a message to reassociate the group identification with the second access point.

10. A mobile station as in claim 5 where the group identification is associated with a first access point, and where said data processor further operates, in response to changing a connection of the mobile station from the first access point to a second access point, to send a message to obtain another group identification that is associated with the second access point.

11. A mobile station as in claim 3, where a set of link layer addresses are tracked as a group.

12. A mobile station as in claim 3, where said mobile station comprises a wireless device.

13. A mobile station as in claim 3, where said mobile station comprises a cellular telephone.

14. A mobile station as in claim 3, where said mobile station comprises a mobile router.

15. A program storage device storing a program of instructions executable by a data processor of a mobile station for performing operations, the operations comprising:
    sending a request for information relating to a plurality of link addresses to a link address manager of an access network, where the mobile station comprises a gateway mobile terminal of a mobile network that further comprises at least one mobile network node, where the gateway mobile terminal is coupled between the at least one mobile network node and an access point of the access network;
    receiving a response to the request from the link address manager; and
    allocating, based on the response, individual ones of the plurality of link addresses to individual ones of the at least one mobile network node of the mobile network.

16. A program storage device as in claim 15, the operations further comprising: performing a neighbor discovery procedure with an access router of the access network to send at least one neighbor advertisement declaring the allocated individual ones of the assigned link addresses.

17. A program storage device as in claim 16, where each mobile network node sends a neighbor advertisement to the access router to declare the link address allocated to the mobile network node.

18. A program storage device as in claim 15, where the request is made to obtain a set of link layer addresses that are allocated to individual ones of the at least one mobile network node.

19. A program storage device as in claim 18, where the set of link layer addresses are associated with a first access point, the operations further comprising, in response to changing a connection of the gateway mobile terminal from the first access point to a second access point, sending a message from the gateway mobile terminal to reassociate the set of link layer addresses with the second access point.

20. A program storage device as in claim 18, where the set of link layer addresses is tracked as a group.

21. A program storage device as in claim 15, where the request is made to obtain a group identification, where the operations further comprise using an obtained group identification to formulate a set of link layer addresses that are allocated to individual ones of the at least one mobile network node.

22. A program storage device as in claim 21, where the group identification is associated with a first access point, the operations further comprising, in response to changing a connection of the Gateway mobile terminal from the first access point to a second access point, sending a message from the gateway mobile terminal to reassociate the group identification with the second access point.

23. A program storage device as in claim 21, where the group identification is associated with a first access point, the operations further comprising, in response to changing a connection of the gateway mobile terminal from the first access point to a second access point, sending a message from the gateway mobile terminal to obtain another group identification that is associated with the second access point.

24. A program storage device as in claim 15, where the request is made to obtain a set of link layer addresses, where the operations further comprise mapping individual ones of the link layer addresses to individual hardwired addresses of individual ones of the at least one mobile network node.

25. A program storage device as in claim 15, where the request is made to obtain a set of link layer addresses, where the operations further comprise mapping individual ones of the link layer addresses to individual media access control addresses of individual ones of the at least one mobile network node.

26. A program storage device as in claim 15, where said mobile station comprises a wireless device.

27. A program storage device as in claim 15, where said mobile station comprises a cellular telephone.

28. A program storage device as in claim 15, where said gateway mobile terminal comprises a mobile router.

29. A program storage device as in claim 15, where said link address manager is associated with said access network.

30. A method comprising:
    sending a request for information relating to a plurality of link addresses to a link address manager of an access network, where the request is sent by a gateway mobile terminal of a mobile network that further comprises at least one mobile network node, where the gateway mobile terminal is coupled between the at least one mobile network node and an access point of the access network;
    receiving, by the gateway mobile terminal, a response to the request from the link address manager;
    allocating, based on the response, individual ones of the plurality of link addresses to individual ones of the at least one mobile network node of the mobile network, where the allocating is performed by the gateway mobile terminal; and
    performing a neighbor discovery procedure with an access router of the access network to send at least one neighbor advertisement declaring the allocated individual ones of the assigned link addresses.

31. A method as in claim 30, where each network node sends a neighbor advertisement to the access router to declare the link address allocated to individual ones of the at least one mobile network node.

32. A method as in claim 30, where the gateway mobile terminal sends at least one neighbor advertisement to the access router to declare the link addresses allocated to individual ones of the at least one mobile network node.

* * * * *